United States Patent
Basri et al.

(10) Patent No.: US 8,385,657 B2
(45) Date of Patent: Feb. 26, 2013

(54) MULTISCALE EDGE DETECTION AND FIBER ENHANCEMENT USING DIFFERENCES OF ORIENTED MEANS

(75) Inventors: Ronen Ezra Basri, Rehovot (IL); Meirav Galun, Rehovot (IL); Achiezer Brandt, Rehovot (IL)

(73) Assignee: Yeda Research and Development Co. Ltd., Rehovot (IL)

( * ) Notice: Subject to any disclaimer, the term of this patent is extended or adjusted under 35 U.S.C. 154(b) by 469 days.

(21) Appl. No.: 12/671,293

(22) PCT Filed: Jul. 31, 2008

(86) PCT No.: PCT/US2008/071764
§ 371 (c)(1),
(2), (4) Date: Jan. 29, 2010

(87) PCT Pub. No.: WO2009/018445
PCT Pub. Date: Feb. 5, 2009

(65) Prior Publication Data
US 2010/0202701 A1    Aug. 12, 2010

Related U.S. Application Data

(60) Provisional application No. 60/953,227, filed on Aug. 1, 2007.

(51) Int. Cl.
*G06K 9/48* (2006.01)
*G06K 9/40* (2006.01)
(52) U.S. Cl. .................................. 382/199; 382/266
(58) Field of Classification Search .................. 382/195, 382/254, 260–270, 274–275, 305, 312, 199; 358/1.2, 3.27; 345/647, 660; 375/254
See application file for complete search history.

(56) References Cited

U.S. PATENT DOCUMENTS 5,123,057  A    6/1992    Verly et al.
(Continued)

FOREIGN PATENT DOCUMENTS

| WO | WO0077735 A1 | 12/2000 |
| WO | 2007/079207 | 7/2007 |

(Continued)

OTHER PUBLICATIONS

International Preliminary Report on Patentabiity, published Feb. 2, 2010 for PCT/US2008/071764, filed Jul. 31, 2008.
(Continued)

*Primary Examiner* — Kanjibhai Patel
(74) *Attorney, Agent, or Firm* — Martin Fleit; Paul D. Bianco; Fleit Gibbons Gutman Bongini & Bianco PL (57) ABSTRACT

Method, apparatus and computer program product that uses a novel algorithm for edge detection suitable for both natural as well as noisy images. A scale adaptive threshold is used along with a recursive decision process to reveal the significant edges of all lengths and orientations and to localize them accurately even in low-contrast and very noisy images. Further the algorithm is use for fiber detection and enhancement by utilizing stochastic completion-like process from both sides of a fiber. The algorithm relies on an efficient multiscale algorithm for computing all "significantly different" oriented means in an image in O(N log p), where N is the number of pixels in the image, and p is the length of the longest structure of interest. Experimental results on both natural and noisy images present confirmation of the method, apparatus and computer program product.

15 Claims, 6 Drawing Sheets

U.S. PATENT DOCUMENTS

| | | | |
|---|---|---|---|
| 5,193,384 A * | 3/1993 | Foley et al. | 73/105 |
| 5,708,767 A | 1/1998 | Yeo et al. | |
| 6,012,058 A | 1/2000 | Fayyad et al. | |
| 6,064,768 A * | 5/2000 | Hajj et al. | 382/195 |
| 6,078,688 A | 6/2000 | Cox et al. | |
| 6,189,005 B1 | 2/2001 | Chakrabarti et al. | |
| 6,330,372 B1 | 12/2001 | Goldstein et al. | |
| 6,502,105 B1 | 12/2002 | Yan et al. | |
| 6,778,698 B1 | 8/2004 | Prakash et al. | |
| 6,801,672 B1 * | 10/2004 | Thomas | 382/275 |
| 6,836,569 B2 * | 12/2004 | Le Pennec et al. | 382/260 |
| 6,879,709 B2 * | 4/2005 | Tian et al. | 382/118 |
| 7,181,086 B2 * | 2/2007 | Gindele et al. | 382/265 |
| 7,349,922 B2 | 3/2008 | Brandt et al. | |
| 7,499,578 B2 * | 3/2009 | Reeves et al. | 382/131 |
| 7,515,763 B1 * | 4/2009 | Zhong | 382/254 |
| 2004/0037466 A1 | 2/2004 | Gewaltig et al. | |
| 2005/0018890 A1 | 1/2005 | McDonald et al. | |
| 2005/0111715 A1 | 5/2005 | Yoo et al. | |
| 2005/0243205 A1 | 11/2005 | Wredenhagen et al. | |
| 2005/0254710 A1 | 11/2005 | Dioguardi et al. | |

FOREIGN PATENT DOCUMENTS

| | | |
|---|---|---|
| WO | 2009/018445 | 2/2009 |

OTHER PUBLICATIONS

Written Opinion published Feb. 1, 2010 for PCT/US2008/071764, filed Jul. 31, 2008.

International Search Report published Feb. 5, 2009, for PCT/US2008/071764, filed Jul. 31, 2008.

International Search Report published Feb. 5, 2009 for PCT/US2008/071764, filed Jul. 31, 2008.

International Preliminary Report published Feb. 2, 2010 for PCT/US2008/071764, filed Jul. 31, 2008.

Hofmann et al, Unsupervised Segmentation of Textured Images by Pairwise Data Clustering, pp. 137-140, 1996 IEEE.

Eitan Sharon et al, Segmentation and Boundary Detection Using Multiscale intensity Measurements, European Commission Project IST-2000-26001 VIBES.

Eitan Sharon et al, Fast Multiscale Image Segmentation, United States-Israel Binational Science Foundation, pp. 1-9, Grant No. 94-00100.

E.H. Adelson et al, Pyramid methods in image processing, pp. 33-41, RCA Engineer—29-6-Nov./Dec. 1984.

CVPR 2000: Hilton Head, SC,USA, 2000 Conference on Computer Vision and Pattern Recognition (CVPR 2000), Jun. 13-15, 2000, IEEE Computer Society 2000, ISBN 0-7695-0662-3 BibTex.

* cited by examiner

Neuron enhancement results. Top: original images. Bottom: enhanced neurons.

MULTISCALE EDGE DETECTION AND FIBER ENHANCEMENT USING DIFFERENCES OF ORIENTED MEANS

BACKGROUND OF THE INVENTION

1. Field of the Invention

The present invention relates to a method, apparatus and computer program product for edge detection suitable for both natural as well as noisy images that includes a novel algorithm.

2. Prior Art

One of the most intensively studied problems in computer vision concerns with how to detect edges in images. Edges are important since they mark the locations of discontinuities in depth, surface orientation, or reflectance. Edges and fibers constitute features that can support segmentation, recognition, denoising, matching and motion analysis tasks.

Figure 1:
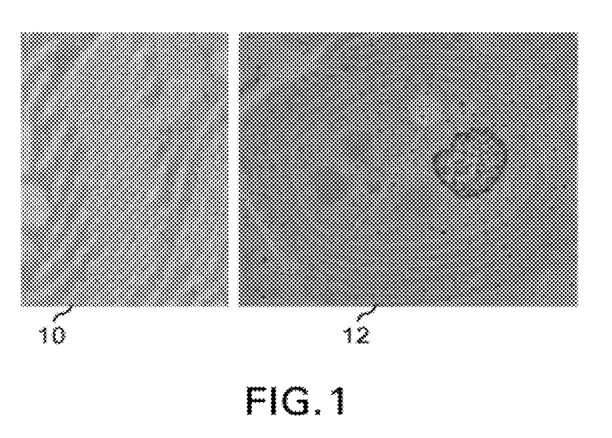
FIG. 1 shows two views of electron microscope images 10 and 12 demonstrating the challenge of detecting edges (at different scales) embedded in noise.
Figure 2:
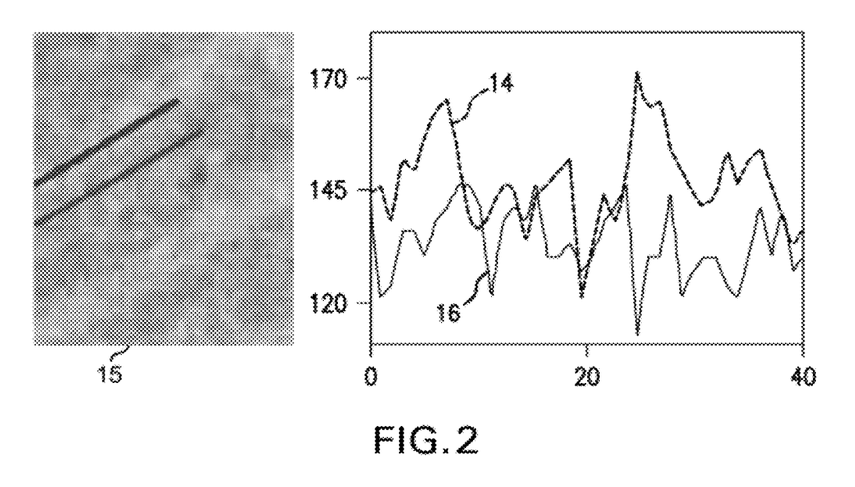
FIG. 2 shows two adjacent noisy intensity profiles 14 and 16, (right) parallel to a long edge (left) in an image 15 acquired by electron microscope.

Accurate detection of edges, discussed supra, can be challenging, particularly when low contrast edges appear in the midst of noise. FIG. 1 shows electron microscope images that demonstrate the challenge of detecting edges (at different scales) embedded in noise. The images in FIG. 1, acquired by an electron microscope, exemplify this kind of challenge. FIG. 2 shows two adjacent noisy intensity profiles (right) parallel to a long edge (left) in an image acquired by electron microscope.

Despite the noise (see profile plots in FIG. 2), such low contrast edges are evident to the human eye due to their consistent appearance over lengthy curves. Accurate handling of low contrast edges is useful also in natural images, where boundaries between objects maybe weak due to similar reflectance properties on both sides of an edge, shading effects, etc.

Common algorithms for edge detection (e.g., J. Canny. A computational approach to edge detection. TPAMI, 8:679-698, 1986. 2) overcome noise by applying a preprocessing step of smoothing, typically using a gaussian kernel of a user specified width. Scale-space representations extend this approach, allowing for a simultaneous delineation of edges from all scales by combining spatially varying gaussian smoothing with automatic scale selection [see T. Lindeberg. Edge detection and ridge detection with automatic scale selection. CVPR, page 465, 1996. 2, and M. Tabb and N. Ahuja. Multiscale image segmentation by integrated edge and region detection. IEEE, Trans. on Image Processing, 6(5):642-655, 1997. 2].

A related approach was designed for fiber enhancement in medical applications [A. Frangi, W. Niessen, K. Vincken, and M. Viergever. Multiscale vessel enhancement filtering. LNCS, 1496:130-137, 1998. 2]. Such isotropic smoothing, however, often reduces the contrast of weak edges, may blend adjacent edges, and may result in poor localization of edges.

To avoid the pitfalls of isotropic smoothing, anisotropic diffusion schemes [such as P. Perona and J. Malik. Scale space and edge detection using anisotropic diffusion. TPAMI, 12(7):629-639, 1990. 2; J. Weickert. A review of nonlinear diffusion filtering. Scale-Space Theory in Computer Vision, LNCS, 1252:3-28, 1997. 2; and R. Kimmel, R. Malladi, and N. Sochen. Images as embedded maps and minimal surfaces: Movies, color, texture, and volumetric medical images. IJCV, 39:111-129, 2000. 2] were proposed as a means for edge-preserving smoothing and image enhancement. These methods utilize a diffusion tensor designed to avoid smoothing in the direction of the intensity gradients, while allowing smoothing in coherence directions. These approaches improve edge localization considerably, and edges at different scales are revealed at different iterations of the diffusion process. These edges remain visible in their original location for many iterations before they finally fade out. A scale selection mechanism however is required to extract edges of different scales. As the reliance on local gradients in traditional diffusion processes may lead to accumulation of noise, recent methods, as noted, above modify the diffusion tensor through isotropic spatial averaging or resetting of its eigen-values. Such spatial smoothing and eigen-value modifications are, however, adapted to a single scale. Moreover, by using an averaged diffusion tensor, these methods accumulate squared local intensity differences, and this may lead to smoothing across noisy, low contrast edges. The reliance on local gradients is a common problem also in both single and multiscale variational methods [see D. Mumford and J. Shah. Optimal approximation by piecewise smooth functions and associated variational problems. Comm. on Pure Applied Math., 42:577-685, 1989. 2; and X. Bresson, P. Vandergheynst, and J. Thiran. Multiscale active contours. IJCV, 70(3):197-211, 2006. 2].

Another stream of work utilizes filters of various lengths, widths, and orientation, yielding curvelet and contourlet image decomposition [see J. Starck, F. Murtagh, E. Candes, and D. Donoho. Gray and color image contrast enhancement by the curvelet transform. IEEE, Trans. on Image Processing, 12(6):706-717, 2003. 2; M. Do and M. Vettcrli. The contourlet transform: an efficient directional multiresolution image representation. IEEE, Trans on Image Processing, 14(12): 2091-2106, 2005. 2; and S. Kalitzin, B. I H. Romeny, and M. Vierger. Invertible apertured orientation filters in image analysis. IJCV, 31(2), 1999. 2].

The focus of these methods, however, is mainly on achieving sparse representations of images and not on edge extraction or fiber enhancement. Finally, recent methods for edge detection in natural images [see M. Ruzon and C. Tomasi. Edge, junction, and corner detection using color distributions. TPAMI, 23(11): 1281-1295, 2001. 2 and D. Maitin, C. Fowlkes, and 3. Malik. Learning to detect natural image boundaries using local brightness, color, and texture cues. TPAMI, 26(5):530-548, 2004. 2, 6] compare histograms of intensity, color (and also texture in D. Maitin et al) in two half disks on either sides of an edge, while in M Ruzon et al the size of the disc is related to the length of the edges. While this approach avoids smoothing across a measured edge, the use of large discs may lead to smoothing across nearby edges. Furthermore, the histograms are calculated at all locations and orientations leading to inefficient schemes.

SUMMARY OF THE INVENTION

The present invention provides a method, apparatus and computer program product that includes an algorithm for edge detection and fiber enhancement designed to work on both natural as well as very noisy images.

More particularly, the method, apparatus and computer program product invention is based on efficient multiscale utilization of elongated filters measuring the difference of oriented means of various lengths and orientations, along with a theoretical estimation of the effect of noise on the response of such filters. A scale adaptive threshold is used along with a recursive decision process to reveal the significant edges of all lengths and orientations and to localize them accurately even in low-contrast and very noisy images. Further, the algorithm is used for fiber detection and enhancement by utilizing stochastic completion-like process from both sides of a fiber. The algorithm relies on an efficient multiscale algorithm for computing all "significantly different" oriented means in an image in $O(N \log \rho)$, where N is the number of pixels in the image, and p is the length of the longest structure of interest. Experimental results on both natural and noisy images are presented.

As noted above, the method, apparatus and computer program product invention is based on efficient utilization of filters measuring difference of oriented means of various lengths and orientations, along with a theoretical estimation of the effect of noise on the response of such filters. In particular, a scale adaptive threshold is derived and used it to distinguish between significant real responses and responses due to noise at any length. This is complemented with a recursive decision process to distinguish between responses due to consistent, long edges and responses due to several scattered sub-edges. The method, apparatus and computer program product enable a considerable reduction in the effect of noise without relying on a prior step of isotropic smoothing, and consequently reveal and accurately localize very noisy, low-contrast edges. More-over, short gaps can be overcome, and despite the use of long filters, the "correct" ends of an edge can be delineated due to the scale multiplicity. The invention also includes an application of the algorithm to fiber detection and enhancement by employing a stochastic completion-like process from both sides of a fiber. This process is quite robust to varying fiber width and fiber branching.

The present invention utilizes the novel algorithm by relying on a fast, bottom-up procedure, following fast calculation of multiple line integrals as disclosed in A. Brandt and J. Dym. Fast calculation of multiple line integrals. SIAM, JSC, 20(4):1417-1429, 1999. 2,4,5, here incorporated by reference, to construct all "significantly different" oriented means at all locations, lengths, and orientations. In this way, the invention utilizes the same number of filters at every length, so that as the length of the filter is increased, its spatial resolution is reduced and proportionally its directional resolution is increased. This, along with a recursive decision process, yields efficient runtime complexity of $O(N \log \rho)$, where N is the number of pixels in the image and $\rho$ is the length of the longest structure of interest typically $\rho \leq O(\sqrt{N})$ Experimental results on various images are presented.

One object of the invention is to provide a method for edge detection in natural and noisy images comprising the steps of: applying efficient multiscale elongated filters to an image to measure the difference of oriented means of various lengths and orientations and obtaining a response; estimating the effect of noise on the response of such filters and obtaining a first output; applying a scale adaptive threshold to the first output along with a recursive decision process to reveal the significant edges of all lengths and orientations and to localize them accurately even in low-contrast and very noisy images and obtaining a second output; and saving the second output.

In the method according to the above, the second output may be visualized. In the method according to the above, a further step of detecting fibers in the image may be included. In the method according to the above, the detected fibers may be enhanced by utilizing a stochastic completion-like process from both sides of a fiber. In the method according to the above, a step may be included of computing all "significantly different" oriented means in an image in $O(N \log \rho)$, where N is the number of pixels in the image, and p is the length of the longest structure of interest.

A further object of the invention is to provide an apparatus for edge detection in natural and noisy images comprising: means for applying efficient multiscale elongated filters to an image to measure the difference of oriented means of various lengths and orientations as a response; means for estimating the effect of noise on the response of such filters and obtaining a first output; means for applying a scale adaptive threshold to the first output along with a recursive decision process to reveal the significant edges of all lengths and orientations and to localize them accurately even in low-contrast and very noisy images and obtaining a second output; and means for saving the second output.

The apparatus above may include means for visualizing the second output. The apparatus above may include means for detecting fibers in the image. The apparatus above may include in the means for detecting fibers includes means for enhancing detected fibers by a means for performing a stochastic completion-like process from both sides of a fiber. The apparatus above may include means for computing all "significantly different" oriented means in an image in $O(N \log \rho)$, where N is the number of pixels in the image, and p is the length of the longest structure of interest.

A still further object of the present invention is to provide a computer-readable medium containing program instructions for edge detection in natural and noisy images comprising program instructions for: applying efficient multiscale elongated filters to an image to measure the difference of oriented means of various lengths and orientations as a response; estimating the effect of noise on the response of such filters and obtaining a first output; applying a scale adaptive threshold to the first output along with a recursive decision process to reveal the significant edges of all lengths and orientations and to localize them accurately even in low-contrast and very noisy images and obtaining a second output; and saving the second output to memory.

The computer-readable medium above may contain program instructions for visualizing the second output, and may contain program instructions for detecting fibers in the image. The computer-readable medium above may contain program instructions for enhancing the detected fibers by a stochastic completion-like processing from both sides of a fiber. The computer-readable medium above may contain program instructions for computing all "significantly different" oriented means in an image in $O(N \log \rho)$, where N is the number of pixels in the image, and p is the length of the longest structure of interest.

DETAILED DESCRIPTION OF THE INVENTION

The method, apparatus and computer program product of the present invention will now be described in detail. The invention uses a novel algorithm to obtain superior results to what have been obtainable using prior art methods. The object of the present invention is to process an image and simultaneously extract edges of all lengths, whether the image is a natural or a noisy image, and to enable the visualization of the edges, such as by displaying the resulting images on a monitor, storing such images in a memory for future visualization, developing copies of images, or printing copies of enhanced images.

Multiscale Edge Detection Algorithm of the Invention

The invention uses a multiscale edge detection algorithm. Let $I(x, y)$ denote a continuous function representing image intensities given in a two-dimensional domain. By oriented means, the family of averages of $I(x, y)$ is denoted along rectangular patches of a given center location $x=(x, y)$, length $L$, width $w$, and orientation $\theta$. Typically in the inventive implementation $w$ is set to a small constant yielding elongated oriented means. The family of oriented means can be obtained via integrals of the form $$F(x, L, w, \theta) = \frac{1}{wL} \int_{-w/2}^{w/2} \int_{-L/2}^{L/2} I(x + \gamma\cos\theta - \delta\sin\theta, y + \gamma\sin\theta + \delta\cos\theta) d\gamma d\delta. \quad (1)$$

The approach utilizes responses of differences of oriented means (briefly denoted responses). This family of responses is defined as $$D(x, L, w, s, \theta) = \quad (2)$$
$$F\left(x + \frac{s}{2}(-\sin\theta, \cos\theta), L, \frac{w}{2}, \theta\right) - F\left(x - \frac{s}{2}(-\sin\theta, \cos\theta), L, \frac{w}{2}, \theta\right),$$

with $s \geq w/4$ to avoid overlap. $D$ defines a difference of neighboring oriented means of the same orientation.

Given a collection of responses, the first task is to determine which response is significant. This is achieved by applying a scale adaptive threshold determined by measuring the magnitude of the noise in the image and by considering the length and width of the measured response. Next, the set of significant responses at each length is examined. While some of these responses may indeed indicate the presence of an edge of the appropriate length, others may be due to scattered collections of shorter edges. Therefore, a recursive decision process is applied to distinguish between these two cases. Finally, the algorithm relies on a framework and a data structure for efficient computation of oriented means as described in A. Brandt and J. Dym. Fast calculation of multiple line integrals. SIAM, JSC, 20(4):1417-1429, 1999. 2,4,5, here incorporated by reference.

Multiscale Noise Estimation

The first task is to identify differences of oriented means that elicit significant responses. A scale adaptive threshold is derived that takes into account the properties of the noise as well as the length and width of our filter. Below it is assumed that the noise does not vary significantly across the image and that the pixel noise is normally distributed as $N(0,\sigma^2)$.

One may apply differences of oriented means $D(x, L, w, s, \theta)$ to an image composed of white noise. Denote by $D_{L,w}$ the discrete form of $D(x, L, w, s, \theta)$, so $D_{L,w}$ is the difference of two averages of $wL/2$ normal distributions. Consequently, $D_{L,w}$ itself distributes normally, $D_{L,w} \sim N(0, \sigma_L^2)$, where $\sigma_L^2 = \sigma^2/(wL)$.

In order to differentiate between responses due to real-edges and those that are due to noise, one can estimate the chance that given a real number $t \gg \sigma_L$, a value $d$ drawn from the distribution $D_{L,w} \sim N(0, \sigma_L^2)$ satisfies $|d|<t$, i.e., $$p(|d|<t) = \frac{1}{\sqrt{2\pi}\,\sigma_L} \int_{-t}^{t} \exp\left(-\frac{x^2}{2\sigma_L^2}\right) dx.$$

Therefore, one estimates the following integral for $t \gg \sigma_L$ $$\int_{t}^{\infty} \exp\left(-\frac{x^2}{2\sigma_L^2}\right) dx = \quad (3)$$
$$\int_{0}^{\infty} \exp\left(-\frac{-(t+x)^2}{2\sigma_L^2}\right) dx = \exp\left(\frac{-t^2}{2\sigma_L^2}\right) \int_{0}^{\infty} \exp\left(-\frac{2tx + x^2}{2\sigma_L^2}\right) dx \approx$$
$$\exp\left(\frac{-t^2}{2\sigma_L^2}\right) \int_{0}^{\infty} \exp\left(-\frac{tx}{\sigma_L^2}\right) dx = \frac{\sigma_L^2}{t} \exp\left(\frac{-t^2}{2\sigma_L^2}\right).$$

With this estimate, one obtains $$p(|d|<t) \approx 1 - \sqrt{\frac{2}{\pi}}\,\frac{\sigma_L}{t} \exp\left(-\frac{t^2}{2\sigma_L^2}\right) = 1 - \epsilon. \quad (4)$$

Suppose $O(N)$ responses of length $L$ are produced, where $N$ is the number of pixels in the image. To differentiate between true edge responses and noise responses, one would like to determine an adaptive threshold $t(w, L, N)$ such that with high probability the values of all noise responses $d$ obtained for a noise image will fall in the range $[-t, t]$. According to (4), this means $(1-\epsilon)^N = O(1)$, which implies $1 - \epsilon N = O$ (1), in other words, to assure high-probability, one demands $1-\epsilon N \geq \frac{1}{2}$ or $$\epsilon < \approx \frac{1}{2N}.\qquad$$

Plugging the
definition of $\epsilon$ (4) into the latter relation and taking the natural logarithm leads to the following approximate relation $$\frac{t^2(w, L, N)}{2\sigma_L^2} = \ln N + \ln\left(\frac{\sigma_L}{t}\right) \approx \ln N, \qquad (5)$$

where the approximation is due to the relation $\ln(\sigma_L/t) \ll t^2/(2\sigma_L^2)$, under the assumption $\sigma_L \ll t$.

This approximation yields the relation $$t(L, w, N) = \sigma\sqrt{\frac{2\ln N}{wL}}, \qquad (6)$$

which means that a response which exceeds $t(L, w, N)$ can potentially indicate the existence of a real edge. This is the scale-adaptive threshold that is used throughout the experiments. Clearly, it can be very useful only if one is able to estimate $\sigma$, the standard deviation of the pixel noise. The invention proposes to estimate $\sigma$ in the following simple way. For each pixel, calculate the minimal standard deviation obtained from the collection of 3×3 windows containing the pixel. Then construct a histogram summarizing the empirical distribution of this minimal standard deviation obtained for all the pixels. $\sigma$ is determined as the $90^{th}$ percentile value of this histogram.

Figure 3:
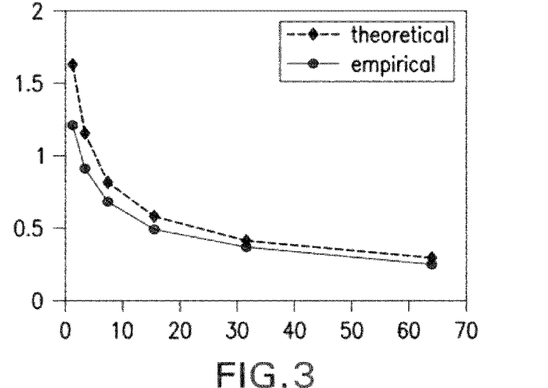
FIG. 3 shows in graph form scale-adaptive noise estimation: length-L vs. the ratio between the scale-adaptive threshold and $\sigma$.

This adaptive threshold has been confirmed empirically. Synthetic white noise images (200×200 pixels) with different values of standard deviation $\sigma$ have been generated, and measured for a width w=4 the maximal response over all length-L responses, for L=2, 4, 8, 16, 32, 64. FIG. 3 shows scale-adaptive noise estimation: length-L vs. the ratio between the scale-adaptive threshold and $\sigma$. This confirms that the ratio obtained, between the maximal response and $\sigma$, is comparable to the theoretical estimate of the ratio, i.e., $$\sqrt{\frac{2\ln N}{wL}}.$$

Recursive Decision Process

A response $D(x, L, w, s, \theta)$ of length L (and fixed w) is considered significant if it exceeds the length adaptive threshold, i.e., $D \geq T_L = t(L,w,N)D$. However, while the threshold is designed to eliminate responses due to noise, long responses may still exceed the threshold due to scattered, short edges of high contrast. Accordingly, a recursive procedure is employed whose objective is to distinguish between responses due to long edges from responses due to scattered sub-edges.

A natural way to determine the composition of a response is to consider sub-portions of the edge and test whether they too give rise to a significant response. For a response of length L, consider an arbitrary sub-edge of length cL (0<c<1). Based on analysis, such a response is considered significant if it exceeds the threshold $T_{cL}$. However, since $T_{cL} > T_L$, requiring every portion of an edge to exceed its respective threshold would amount to requiring the complete length-L edge to exceed the higher threshold $T_{cL}$, making the scale-adaptive threshold useless. A more relaxed approach is to require each sub-edge of length cL to pass the threshold for the complete edge $T_L$. This approach too is unsatisfactory since, due to noise, short portions of an edge may fall below the threshold.

This problem is solved by the present invention by requiring that most of the sub-edges will pass some lower threshold and that the remaining gaps will be short relative to the length of the edge. Therefore, two parameters are defined, $\alpha$ and $\beta$ ($0 \leq \alpha, \beta \leq 1$). $\alpha T_L$ is set to be a low threshold for length-L responses. Namely, responses of length L that exceed $\alpha T_L$ and do not exceed $T_L$ are considered nearly significant, i.e., they are not significant enough to form an edge on their own, but they can form sub-portions of longer edges. In addition, $\beta L$ is set to be a threshold on the total gap size for length-L edges, i.e., a length-L edge cannot be considered significant if it contains sub-portions of total length>$\beta L$ that do not exceed their respective low threshold. With such a long gap the response cannot be marked as an edge even if it exceeds its corresponding threshold $T_L$.

These principles or rules are implemented in a recursive procedure as follows. w and s are set to constants, and the processing begins with the set of responses $D(x, L, w, s, \theta)$ obtained for filters of some predetermined short length, e.g., L=1. Each response is classified to one of the following three classes: (1) significant ($D > T_L$) (2) nearly-significant ($\alpha T_L < D \leq T_L$) and (3) non-significant ($D \leq \alpha T_L$). For the first two classes the total gap size is set to "0", while for the latter class the gap size is set to "L".

The method proceeds by sequentially considering lengths of powers of 2. The classification of every length-L response at location x, $D(x, L, w, s, \theta)$, is affected by the classification of its associated length-L/2 responses, $D(x \pm (L/4) (\cos \theta, \sin \theta), L/2, w, s, \theta)$ as described below. In addition, the total gap size is set to be the sum of gap sizes associated with these responses.

A length-L response D is classified significant if it exceeds the respective threshold, $D > T_L$, and its total gap size is below $\beta L$. In this case the response is marked as a potential edge and its gap size is reset to zero.

A length-L response D is classified nearly-significant if $\alpha T_L < D \leq T_L$ and its total gap size is below $\beta L$. In this case, its gap size is not updated.

A length-L response D is classified non-significant if $D \leq \alpha T_L$ or if its total gap size exceeds $\beta L$. In this case its total gap size is reset to L.

Marked potential edges are further tested for statistical significance. The intensity profiles are considered along the two sides of a potential edge and denote by $\sigma_{local}$ the maximum of the two empirical standard deviations on either side. Then, edges are removed for which $$D < c\sqrt{\frac{2\ln N}{wL}}\sigma_{local},$$

typically c=1. This condition generalizes equation (6) by replacing the global noise $\sigma$ with a local estimate of the noise, $\sigma_{local}$, yielding a scale-dependent local threshold. This test allows less strictness with the selection of $\alpha$ and $\beta$.

Finally, a process of angular non-maximal suppression is applied followed by spatial non-maximal suppression in each length L. The non-maximal suppression is a necessary step to ensure well-localized edges, expressed by a single response. Moreover, an inter-scale suppression is performed, to ensure that each edge is identified with its maximal perceptual length.

This inter- and intra-scale decision process, along with the scale-adaptive threshold, enable overcoming noise without prior smoothing, and therefore, reveal and accurately localize very noisy, low-contrast edges, enabling their visualization.

Hierarchical Construction of Oriented Means

Differences of oriented means are constructed by adding and subtracting width-1 oriented means of the appropriate length. The family of width-1 oriented means, $F(x, L, w, \theta)$ is defined over an infinite set of locations, lengths, and orientations, but under minimal smoothness assumptions of $I(x, y)$, it is possible to obtain any oriented mean in this family from only a finite collection of oriented means. Oriented means at interim locations, lengths, and orientations can then be computed by interpolation with an accuracy determined by the spatial and angular resolutions.

Following the procedure set forth in A. Brandt and J. Dym. Fast calculation of multiple line integrals. SIAM, JSC, 20(4): 1417-1429, 1999. 2,4,5, the minimal spatial and angular resolutions depend on the length L as follows The minimal spatial resolution in the direction of integration is inversely proportional to the integration length. In particular, when doubling the integration length, the number of evaluation points may be halved.

The spatial resolution perpendicular to the direction of integration is independent of the integration length.

The minimal angular resolution is proportional to the integration length. In particular, if the integration length is doubled, the number of angles computed per site must also be doubled.

A direct consequence of these observations is that the total number of integrals at any length L is independent of L.

Figure 4:
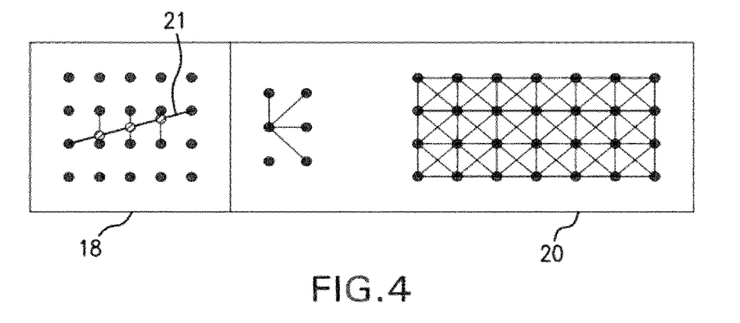
FIG. 4 shows in the left panel 18: direct calculation of oriented mean (w=1, L=4): an interpolation from the given data points to the points 21 is followed by the trapezoid rule. In the right panel 20: base level initialization: stencil of four length-1 integrals for each pixel (left) cover the whole grid (right).

FIG. 4 shows in the left panel 18 direct calculation of oriented mean (w=1, L=4): an interpolation from the given data points to the points 21 is followed by the trapezoid rule. The right panel 20 shows base level initialization, stencil of four length-1 integrals for each pixel (left) cover the whole grid (right). FIG. 4 (left) depicts the common direct approach to approximating discrete oriented means of orientation $$|\theta| \leq \frac{\pi}{4}.$$

Using the trapezoid rule, the oriented mean for, e.g., the line segment depicted in FIG. 4 (left), is given by the sum over the three interior points (obtained by interpolation from nearby data points) plus the average of the endpoints, divided by four. Similar calculation applies for oriented means with $$\frac{\pi}{4} \leq \theta \leq \frac{3\pi}{4}.$$

However, this direct approach is quite expensive to approximate many oriented means.

Figure 5:
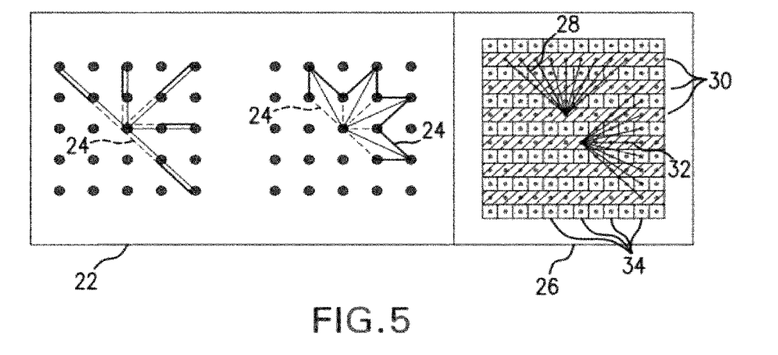
FIG. 5 shows in the left panel 22: building integrals of length-2 from integrals of length-1, for existing directions (left), by taking the average of length-1 adjacent integrals (dashed lines 24) in that direction, and for a new direction (right), by averaging four nearest integrals (dashed lines 24). The right panel 26: the lines 28 denote length-4 vertically oriented means, which are calculated at each $2^{nd}$ row (rows 30). The lines 32 denote length-4 horizontally oriented means, which are calculated at each $2^{nd}$ column (columns 34).

Next the method follows the procedure of A. Brandt and J. Dym. Fast calculation of multiple line integrals. SIAM, JSC, 20(4):1417-1429, 1999. 2,4,5, incorporated herein by reference, and a fast, hierarchical recursive calculation is described of "all significantly different" oriented means in a discrete image. In the context of a discrete image, the length of an oriented mean is defined on a uniform grid as the length of its maximal projection onto the x- and y-axis, where the length units are pixels. The hierarchical construction is as follows. At the base level, for each pixel four length-1 oriented means are calculated (see FIG. 4, right panel 20). The total number of oriented means at this level is therefore 4N. Recursively, given 4N oriented means of length L the method proceeds to compute new 4N oriented means of length 2L. Following the principles outlined above, the angular resolution should be doubled. Consequently, the new oriented means can be divided into two equally sized sets. Half of the new oriented means follow the same directions of those of the previous level, while the other half of the oriented means follow intermediate directions. The first set of oriented means can be computed simply by taking the average of two length-L oriented means with one coinciding endpoint (see FIG. 5, left panel 22). The second set of oriented means can be obtained by interpolation of four length-L oriented means of nearby directions. These four oriented means form a tight parallelogram around the desired length-2L integral. This is illustrated in FIG. 5, which shows in the left panel 22, building integrals of length-2 from integrals of length-1, for existing directions (left), by taking the average of length-1 adjacent integrals (dashed lines 24) in that direction, and for a new direction (right), by averaging four nearest integrals (dashed lines 24). The right panel 26 shows lines 28 denoting length-4 vertically oriented means, which are calculated at each $2^{nd}$ row (rows 30). The lines 32 denote length-4 horizontally oriented means, which are calculated at each $2^{nd}$ column (columns 34). In FIG. 5, shows in the left panel 22 the average of the four length-1 oriented means is used to construct a length-2 oriented mean. This can be viewed as first linearly interpolating the two nearest directions to approximate the new direction at length-1, then creating a length-2 oriented mean by averaging two adjacent interpolated oriented means.

It should be emphasized that the numerical error introduced by this fast calculation, relative to the slow, direct approach, is smaller than the error induced by discretizing $I(x, y)$. The algorithm is very efficient, it calculates "all significantly different" oriented means in $O(N \log \rho)$, where N is the number of pixels in the image and $\rho$ is the length of the longest oriented mean, typically $\rho \leq O(\sqrt{N})$.

Implementation

For implementation, a hierarchical data structure is maintained of the angular and spatial resolutions as follows. At the base level, for each pixel length-1 oriented means at four directions are calculated. The angular resolution of length-2L oriented means is twice the angular resolution of length-L oriented means. The spatial resolution is halved as the length is doubled as follows. Length-L vertically oriented means $$\left(\frac{\pi}{4} \leq \theta \leq \frac{3\pi}{4}\right)$$

are calculated at every $(L/2)^{th}$ row, at each pixel in this row. Length-L horizontally oriented means $$\left(|\theta| \leq \frac{\pi}{4}\right)$$

are calculated at every $(L/2)^{th}$-column, at each pixel in this column. In this manner, each length-L oriented mean has an overlap of length L/2 with another length-L oriented mean of the same orientation, in order to improve accuracy. As a result, at each scale (length) the number of oriented means is 8N, except for the shortest level (length-1) for which 4N oriented means are calculated. Note that at each length only 4N of the 8N oriented means are used to construct the subsequent level. The grid setting for L=4 is illustrated in FIG. 5 (right panel 26).

The recursive decision process of the method is evoked during the construction of oriented means after the construction of every length, maintaining the low complexity of the algorithm. For this decision process there is associated with each length-L response the two (if the longer response follows an orientation of the previous level) or four (if the longer response is of a "new" orientation) length-L/2 responses from which it was generated. Finally, the local standard deviation test can be applied by accessing the raw pixels, assuming only a sparse set of responses are considered significant. Alternatively, $\sigma_{local}$ can be recursively accumulated by computing in addition oriented means for the squared image, $I^2(x, y)$, doubling the overall complexity.

Experiments

The novel algorithm employs differences of oriented means $D(x, L, w, s, \theta)$ at lengths L=1, 2, 4, 8, 16, 32, 64, with s=2, w=2 and s=5, w=4 for the edge detection in natural images and noisy images, respectively.

Noisy Images

Figure 6:
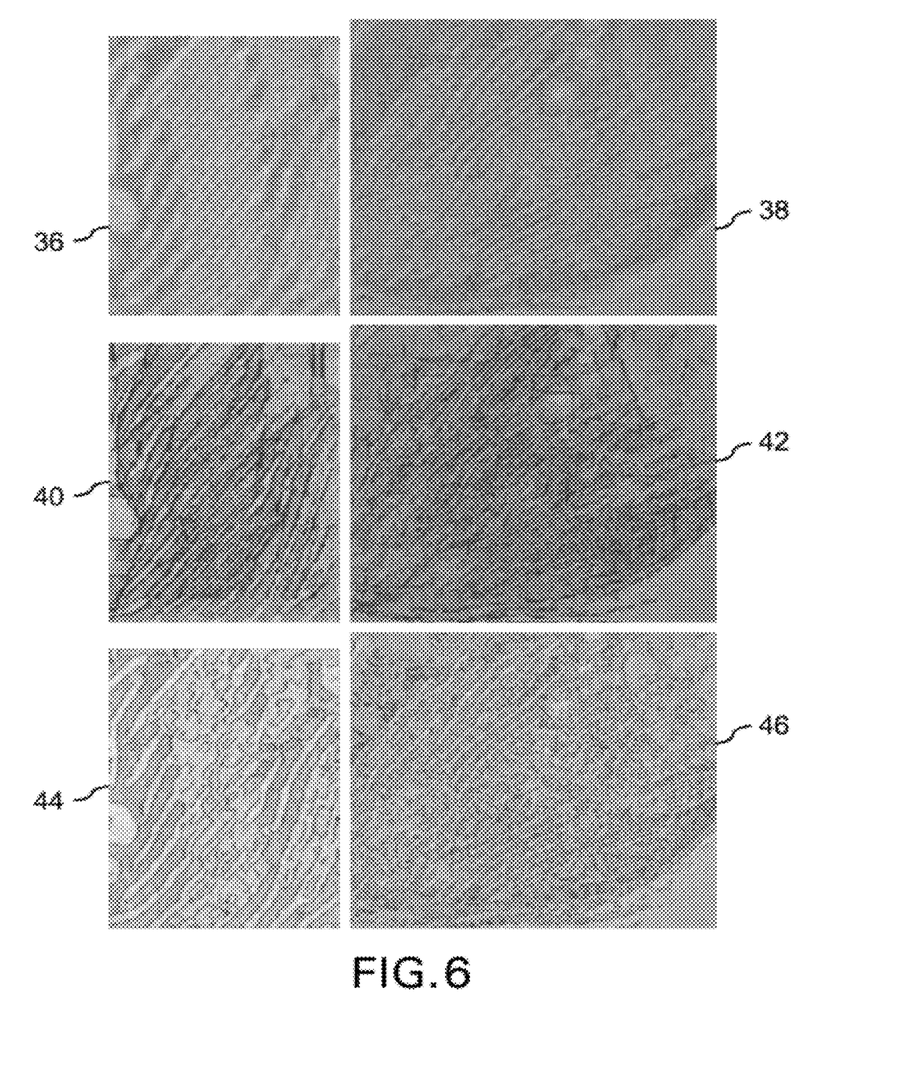
FIG. 6 shows edge detection. Top row shows original images 36 and 38. Middle row images 40 and 42 show edges obtained by algorithm overlaid on the original images. Bottom row images 44 and 46 shows edges obtained by Canny edge detector.

The edge detection algorithm has been implemented and tested on very noisy images acquired by an electron microscope. For this implementation $\alpha=\sqrt{0.5}$ and $\beta=\frac{3}{8}$ are used. FIG. 6 contains images 36 and 38 of a plant under certain photosynthetic conditions. Depending on lighting, the membranes, which are sub-cell organs (organelles), are sometimes very close to each other. As demonstrated in the figure, the algorithm performs very well in detecting the edges of the membranes, independently of the scale (length) and the membranes' density. FIG. 6 shows edge detection. The top row of images 36 and 38 shows the original images. The middle row of images 40 and 42 shows edges obtained by the novel method and algorithm overlaid on the original images. The bottom row of images 44 and 46 shows edges obtained by Canny edge detector. A Canny edge detector (with optimized parameters) cannot reveal these dense edges, due to the pre-smoothing.

Figure 7:
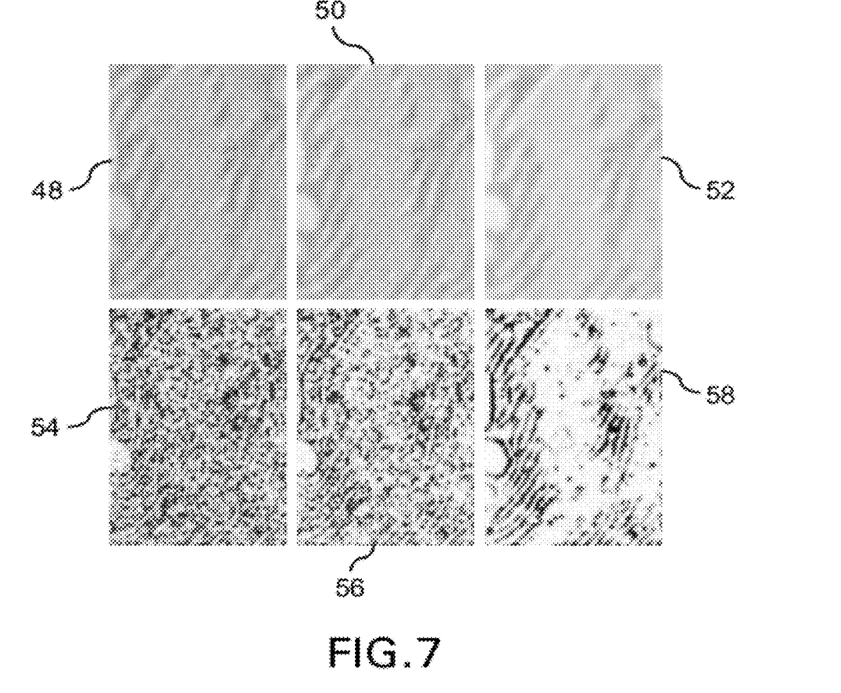
FIG. 7 shows Image enhancement and inverse gradient by Beltrami flow. The top row of three images 48, 50 and 52 show image enhancement after 8, 11 and 20 iterations, respectively, (from left to right). The bottom row of three images 54, 56 and 58 show, respective, inverse gradients.
Figure 8:
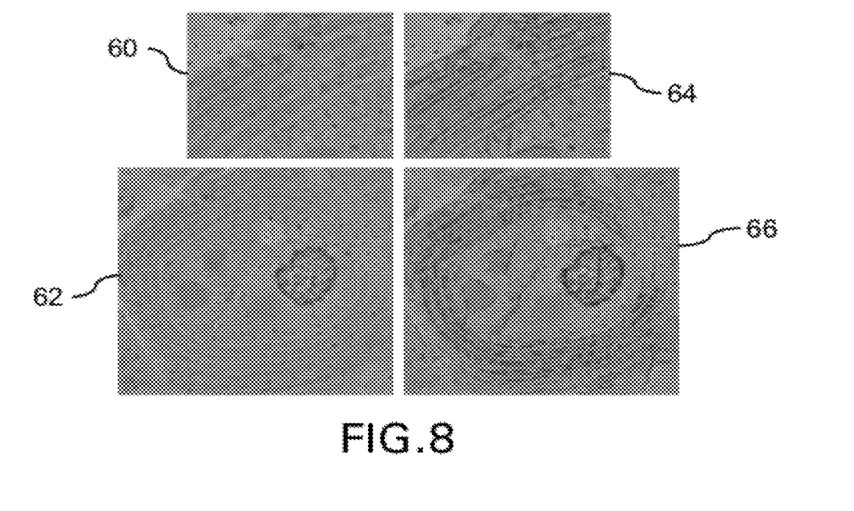
FIG. 8 shows edge detection. In the left column original images 60 and 62 are shown. In the right column images 64 and 66 show edges obtained by the algorithm of inventive method overlaid on the original images.

A comparison was made between the novel method and algorithm of the present invention with an implementation (following R. Kimmel, M. Bronstein, and A. Bronstein. In Numerical geometry of images: Theory algorithms and applications, page 148. Springer-Verlag, New York, 2004. 6) of the Beltrami flow anisotropic-diffusion. The enhanced images and their respective inverse gradients are shown in FIG. 7. FIG. 7 shows Image enhancement and inverse gradient by Beltrami flow. The top row of three images 48, 50 and 52 show image enhancement after 8, 11 and 20 iterations, respectively, (from left to right). The bottom row of three images 54, 56 and 58 show respective inverse gradients. It can be seen that different structures are enhanced in different iterations, yet the dense organelles structure is not revealed at any iteration, and the overall result is severely affected by the amount of noise present in this image. FIG. 8 contains images 60 and 62 of bacteria environment. FIG. 8 shows edge detection. The left column shows the original images 60 and 62. The right column images 64 and 66 show edges obtained by application of the algorithm of the inventive method overlaid on the original images. The inventive algorithm extracts edges at all scales, both elongated and circular.

Natural Images

Further, the novel method and algorithm has been applied to the 100 gray level test images of the Berkeley segmentation dataset and human annotation benchmark [see D. Martin, C. Fowlkes, D. Tal, and J. Malik. A database of human segmented natural images and its applications to evaluating segmentation algorithms and measuring ecological statistics. ICCV, 2:416-423, 2001.6]. For this implementation, $\alpha=\sqrt{0.8}$ and $\beta=0$ was used. Although this dataset is not ideal for evaluating the inventive method as (1) human annotation is affected to a large extent by semantic considerations, (2) subjects only marked subsets of the boundaries, and (3) the inventive method does not deal with texture; it nevertheless demonstrates that the inventive method achieves competitive results on natural images. To determine boundary classification, a response was associated with every edge point in a manner similar to that used in D. Maitin, C. Fowlkes, and 3. Malik. Learning to detect natural image boundaries using local brightness, color, and texture cues. TPAMI, 26(5):530-548, 2004. 2, 6. Specifically, two intensity histograms were computed for the two half-discs (using discs of radius 7 pixels) centered in each edge center and oriented according to the edge direction. Then a $\chi^2$ histogram difference measure was used to compare the two histograms $$\chi^2(g, h) = \frac{1}{2} \sum \frac{(g_i - h_i)^2}{a_i + h_i}.$$

Figure 9:
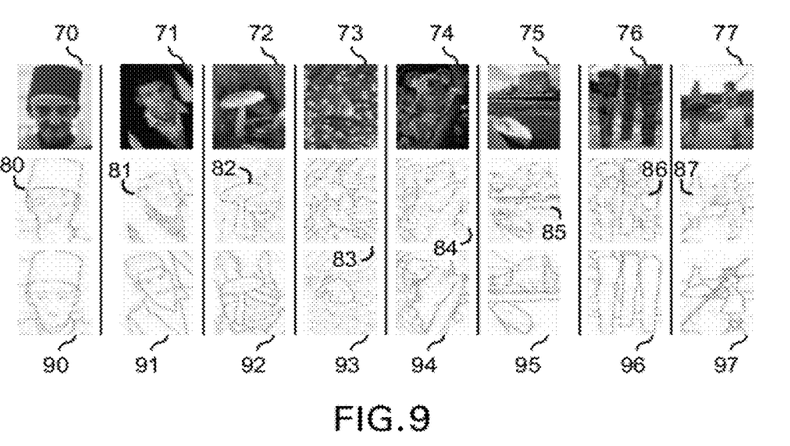
FIG. 9 shows edge detection results. In the top row are shown original images 70-77. The middle row of images 80-87 shows the results using the inventive method. The bottom row of images 90-97 show human-marked boundaries.

Finally these values were normalized (for each image) between 0 and 1. FIG. 9 shows some example images, demonstrating the exact localization of edges that can be achieved with the method. FIG. 9 shows edge detection results. The top row shows the original images 70-77. The middle row of images 80-87 shows the results using inventive method. The bottom row of images 90-97 shows the human-marked boundaries.

Further the standard F-measure test is used, which provides a trade-off between precision (P) and recall (R) defined as $F=PR/(\gamma R+(1-\gamma)P)$, with $\gamma$ set to 0.5. These are computed using a distance tolerance of 2 pixels to allow for small localization errors in both the machine and human boundary maps. Table 1 shows the F-measure values achieved by our algorithm compared to other edge detection algorithms. Code and results of other algorithms are obtained from Berkeley at http://www.eecs.berkeley.edu/Research/Projects/CR/vision/qroupinq/seqbench/.

TABLE 1

F-measure comparison over different edge detection algorithms

| Algorithm | F-measure |
| --- | --- |
| our multiscale edge detection algorithm | 0.61 |
| Brightness Gradient | 0.60 |
| Multiscale Gradient Magnitude | 0.58 |
| Second Moment Matrix | 0.57 |
| Gradient Magnitude | 0.56 |
| Random | 0.41 |

Using non-optimized (combined Matlab and C++) implementation requires 3, 11, and 18 seconds for 171×246, 481×321 and 512×512 images, respectively, on a Pentium 4, 2.13 GHz PC. Results over the entire dataset are provided in the supplementary material.

Fiber Detection and Enhancement

The inventive method is further extended to detect and enhance elongated fibers. Fibers appear in many types of images, particularly in biomedical imagery and airborne data. Detection of fibers can be difficult due to both imaging conditions (noise, illumination gradients) and shape variations (changes in widths, branchings). The inventive method uses edges, along with their sign (transition from dark to light or vice versa) to highlight the fibers. Specifically, the method begins by detecting all edges in the image. Next, those edges are marked as either "red" or "blue", by classifying their gradient orientation relative to a pre-specified canonical orientation. Then two diffusion maps are constructed, one for the red and the other for the blue edge maps, by convolving the binary edge map with a gaussian filter. Finally, the two diffusion maps are multiplied to obtain the enhanced fibers. This process is analogous to stochastic completion of contours [see D. Mumford. Elastica and computer vision. In C. Bajaj, editor, Algebraic geometry and its applications. Springer, 1994. 7] with each edge point emitting particles to its surroundings. The product of the diffusion maps reflects the probability of beginning in one edge and ending in a neighboring edge of opposite gradient sign. This process is quite robust to varying fiber width and fiber branching, and although many red and blue responses may appear in the image, only those that can be paired are enhanced.

Figure 10:
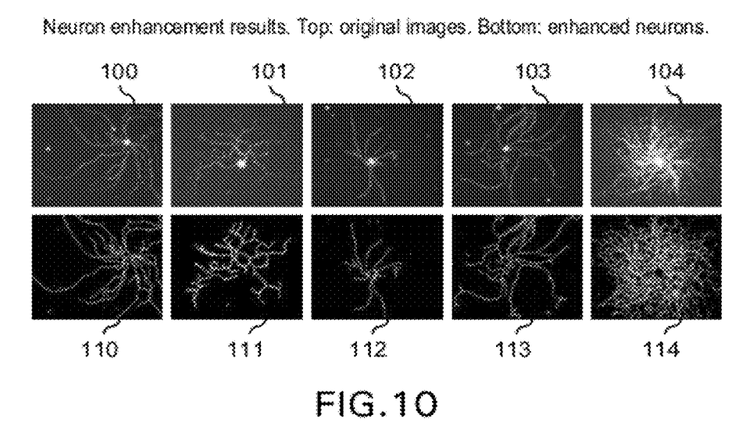
FIG. 10 shows neuron enhancement results; in the top row of images 100-104 are shown the original images, in the bottom row of images 110-114 are shown the enhanced neuron images using the method of the present invention.

The fiber enhancement process was applied to fluorescent images of nerve cells. Comparison of these cells under different conditions requires quantitative measurements of cellular morphology, and a commonly used measure is the total axonal length. Typically, a single experiment produces hundreds of images, many of which may suffer from low signal to noise ratio. Therefore, there is an obvious need for fast and accurate automatic processing of such images. Using the multiscale fiber enhancement technique noted above, the branching axonal structures are identified and their total length measured. FIG. 10 shows neuron enhancement results. The top images 100-104 are original images, and the bottom images 110-114 are the enhanced neuron images using the method of the present invention. FIG. 10 shows examples of images of nerve cells and their enhanced axonal structures. The total axonal length was further computed automatically from the enhanced images and compared to a manual length estimation applied to the original images. The two measures match with slight deviation, see Table 2. For this implementation $\alpha=\sqrt{0.5}$ and $\beta=0.0$ is used.

TABLE 2

Measuring total axonal length: manual length estimation vs. automatic length estimation (in pixel units), for the four left-most images 100-103 in FIG. 10

| Manual estimation | 11940 | 4467 | 3407 | 7347 |
|---|---|---|---|---|
| Automatic estimation | 11180 | 4106 | 3620 | 9092 |
| Relative error (percents) | −6.37 | −8.08 | 6.25 | 23.75 |

Exemplary Implementations

The present invention can be realized in hardware, software, or a combination of hardware and software. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form. A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer system to read such computer readable information.

Figure 11:
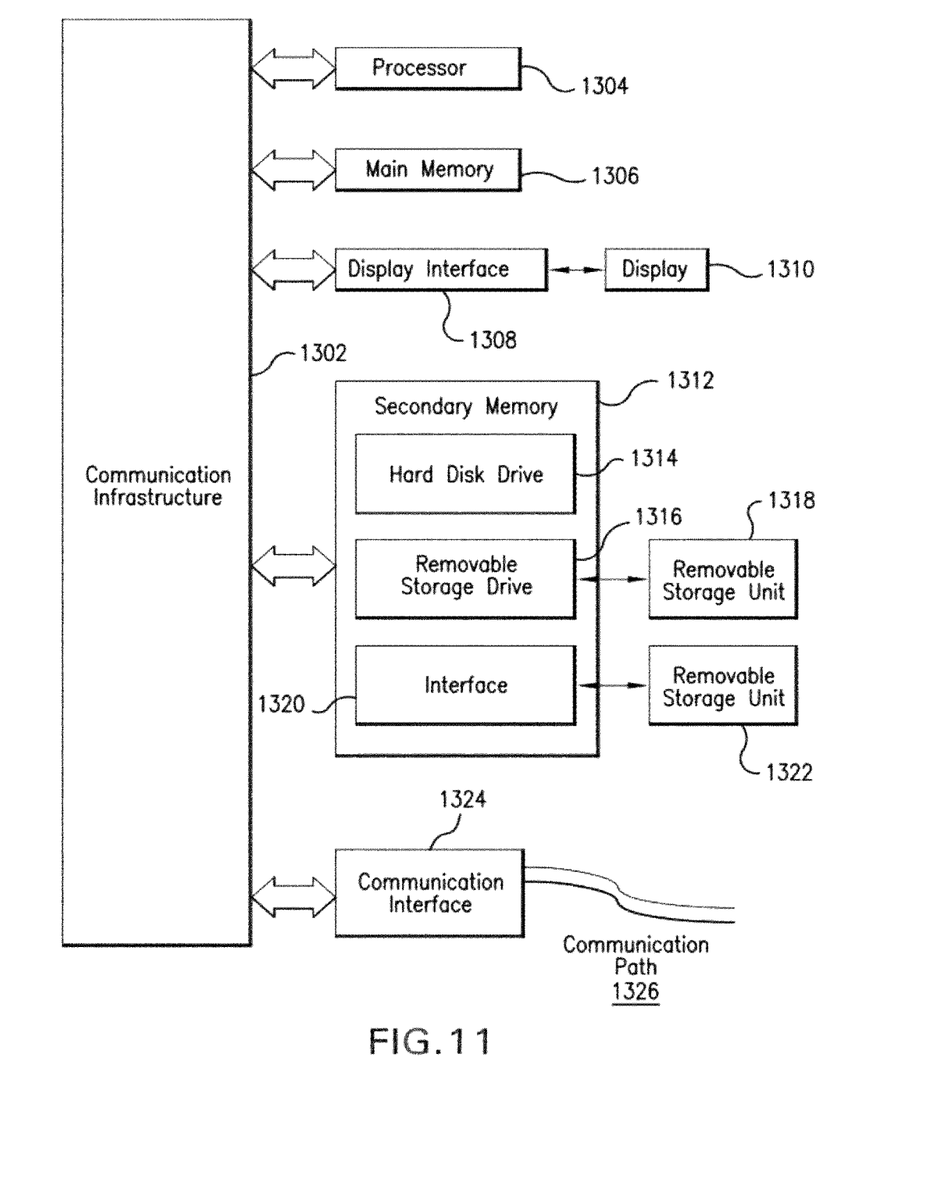
FIG. 11 is a block diagram of a computer system useful for implementing an embodiment of the present invention

FIG. 11 is a block diagram of a computer system useful for implementing an embodiment of the present invention. The computer system includes one or more processors, such as processor 1304. The processor 1304 is connected to a communication infrastructure 1302 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 1308 that forwards graphics, text, and other data from the communication infrastructure 1302 (or from a frame buffer not shown) for display on the display unit 1310. The computer system also includes a main memory 1306, preferably random access memory (RAM), and may also include a secondary memory 1312. The secondary memory 1312 may include, for example, a hard disk drive 1314 and/or a removable storage drive 1316, representing a floppy disk drive, a magnetic tape drive, an optical disk drive, and more. The removable storage drive 1316 reads from and/or writes to a removable storage unit 1318 in a manner well known to those having ordinary skill in the art. Removable storage unit 1318 represents a floppy disk, magnetic tape, optical disk, and more which is read by and written to by removable storage drive 1316. As will be appreciated, the removable storage unit 1318 includes a computer usable storage medium having stored therein computer software and/or data.

In alternative embodiments, the secondary memory 1312 may include other similar means for allowing computer programs or other instructions to be loaded into the computer system. Such means may include, for example, a removable storage unit 1322 and an interface 1320. Examples of such may include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to the computer system.

The computer system may also include a communications interface 1324. Communications interface 1324 allows software and data to be transferred between the computer system and external devices. Examples of communications interface 1324 may include a modem, a network interface (such as an Ethernet card), a communications port, a PCMCIA slot and card, and more Software and data transferred via communications interface 1324 are in the form of signals which may be, for example, electronic, electromagnetic, optical, or other signals capable of being received by communications interface 1324. These signals are provided to communications interface 1324 via a communications path (i.e., channel) 1326. This channel 1326 carries signals and may be implemented using wire or cable, fiber optics, a phone line, a cellular phone link, an RF link, and/or other communications channels. In this document, the terms "computer program medium," "computer usable medium," and "computer readable medium" are used to generally refer to media such as main memory 1306 and secondary memory 1312, removable storage drive 1316, a hard disk installed in hard disk drive 1314, a CD, a DVD, an optical disk and signals. These computer program products are means for providing software to the computer system. The computer readable medium allows the computer system to read data, instructions, messages or message packets, and other computer readable information from the computer readable medium. The method of the invention may be incorporated on such a computer readable medium or media. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information.

Computer programs (also called computer control logic) are stored in main memory 1306 and/or secondary memory 1312. Computer programs may also be received via communications interface 1324. Such computer programs, when executed, enable the computer system to perform the features of the present invention as discussed herein.

In particular, the computer programs, when executed, enable the processor 1304 to perform the features of the computer system. Accordingly, such computer programs represent controllers of the computer system.

The novel method, apparatus and computer program product concerns the novel algorithm for edge detection suitable for both natural as well as noisy images. The method utilizes efficient multiscale hierarchy of responses measuring the difference of oriented means of various lengths and orientations. A scale-adaptive threshold is used along with a recursive decision process to reveal the significant edges at all scales and orientations and to localize them accurately. Further an application has been presented for fiber detection and enhancement by utilizing stochastic completion-like processing from both sides of a fiber. Still further the method can be extended to handle edges of varying widths, to estimate and incorporate local noise, and to track curved edges.

Although the invention has been described in terms of specific embodiments and procedures, it will be evident to those of skill in the art that changes and modifications can be made without departing from the teachings herein. Such changes and modifications are deemed to come within the purview of the claims.

What is claimed is:

1. A method for electronically processing an electronically stored image by a computer having a processor, circuitry for controlling the processor and memory for simultaneously extracting edges of all lengths, whether the image is a natural or a noisy image, and for enabling visualization of the edges, by one of displaying the resulting image on a monitor, storing such images in a memory for future visualization, developing copies of images, and printing a copy of the resulting image comprising the steps of:

a. storing an image in O (N log ρ), where N is the number of pixels in the image, and ρ is the length of the longest edge structure of interest pixel by pixel in the memory of the computer;
  b. storing non-transitory computer coded instructions for configuring computer circuitry for programming the processor of the computer for;
    i. filtering the stored image to obtain a set of responses that measures difference of oriented means of various lengths and orientations, and to construct all significantly different oriented means at all locations, lengths, and orientations in the image;
    ii. said filtering being carried out by a multiscale edge detection algorithm based on I(x, y) denoting a continuous function representing image intensities given in a two-dimensional domain and the oriented means comprising the family of averages of I(x, y) being denoted along rectangular patches of a given center location x=(x, y), length L, width w, and orientation θ with w set to a small constant yielding elongated oriented means;
    iii. processing the oriented means via integrals of the form $$F(x, L, w, \theta) = \frac{1}{wL}\int_{-w/2}^{w/2}\int_{-L/2}^{L/2} I(x + \gamma\cos\theta - \delta\sin\theta, y + \gamma\sin\theta + \delta\cos\theta)\,d\gamma\,d\delta. \quad (1)$$

to obtain a family of responses of differences of oriented means defined as $$D(x, L, w, s, \theta) = \quad (2)$$
$$F\left(x + \frac{s}{2}(-\sin\theta, \cos\theta), L, \frac{w}{2}, \theta\right) - F\left(x - \frac{s}{2}(-\sin\theta, \cos\theta), L, \frac{w}{2}, \theta\right),$$

with $s \geq w/4$ to avoid overlap, and wherein D defines a difference of neighboring orientations of the same orientation;
    iv. determining the significance of a collection of such responses by applying a scale adaptive threshold algorithm $$t(L, w, N) = \sigma\sqrt{\frac{2\ln N}{wL}}, \quad (6)$$

to the collection of responses wherein pixel noise is determined as $N(0,\sigma^2)$, and wherein σ is a parameter of pixel noise, and wherein a response which exceeds t(L, w, N) can potentially indicate the existence of a real edge;
    v. implementing a recursive decision step to classify the collection of responses according to the following classes
      a. a length-L response D is classified significant if it exceeds the respective threshold, $D > T_L$, and its total gap size is below βL and the response is marked as a potential edge and its gap size is reset to zero;

b. a length-L response D is classified nearly-significant if $\alpha T_L < D \leq T_L$ and its total gap size is below βL and its gap size is not updated;

c. a length-L response D is classified non-significant if $D \leq \alpha T_L$ or if its total gap size exceeds βL and its total gap size is reset to L;

wherein α and β are preselected parameters (0≤α, β≤1) and wherein $\alpha T_L$ is set to be a low threshold for length-L responses, namely, responses of length L that exceed $\alpha T_L$ and do not exceed $T_L$ and are considered nearly significant, and βL is set to be a threshold on the total gap size for length-L edges, i.e., a length-L edge is not be considered significant if it contains sub-portions of total length>βL that do not exceed their respective low threshold;

vi. wherein the classification of the collection of responses D(x, L, w, s, θ) obtained for filters of some predetermined short length, e.g., L=1 is carried out and each response is classified to one of the following three classes: (1) significant ($D>T_L$) (2) nearly-significant ($\alpha T_L < D \leq T_L$) and (3) non-significant ($D \leq \alpha T_L$) and for the first two classes, the total gap size is set to "0", while for the latter class the gap size is set to "L", and proceeding sequentially considering lengths L of powers of 2;

vii. testing identified potential edges for statistical significance by examining the intensity profiles along the two sides of a potential edge and eliminating potential edges that do not meet a given standard and marking the remaining edges as significant edges;

viii. applying angular non-maximal suppression to each remaining edge to ensure well-localized significant edges;

ix. applying spatial inter-scale suppression to ensure that each significant edge is identified with its maximal perceptual length;

x. outputting data regarding significant edges of the image to memory; and xi. enabling visualization of the edges, by one of displaying the resulting image on a monitor, storing such images in a memory for future visualization, developing copies of images, and printing a copy of the resulting image.

2. The method of claim 1 wherein step b. vii. Is carried out by denoting by $\sigma_{local}$, a local estimate of the noise, the maximum of the two empirical standard deviations on either side, and removing edges for which $$D < c\sqrt{\frac{2\ln N}{wL}}\,\sigma_{local}$$

with c=a.

3. The method of claim 1 wherein step b. ii. Is carried out by constructing differences of oriented means by adding and subtracting width-1 oriented means of the appropriate length to obtain a family of width-1 oriented means, F(x, L, w, θ) defined over an infinite set of locations, lengths, and orientations, but under minimal smoothness assumptions of I(x, y), and obtain any oriented mean in this family from only a finite collection of oriented means with oriented means at interim locations, lengths, and orientations determined by interpolation with an accuracy dependent on spatial and angular resolutions.

4. The method of claim 1 further including the steps of:

xii. marking detected edges either "red" or "blue", by classifying their gradient orientation relative to a pre-specified canonical orientation and creating two maps, one for the edges marked red and one for the edges marked blue;

xii. constructing two diffusion maps, one for the red and the other for the blue edge maps, by convolving each with a Gaussian filter, and then multiplying the two diffusion maps to obtain the enhanced fibers.

5. The method of claim 1 wherein the image is nerve cells and the method identifies the branching axonal structures in the image and measures their total length.

6. Apparatus for processing an image whether the image is a natural or a noisy image to extract simultaneously edges of all lengths and for enabling visualization of the edges by a computer having a processor, circuitry for controlling the processor and memory for simultaneously extracting edges of all lengths, whether the image is a natural or a noisy image, and for enabling visualization of the edges, by one of displaying the resulting image on a monitor, storing such images in a memory for future visualization, developing copies of images, and printing a copy of the resulting image comprising:

a. a computer having a processor, circuitry for controlling the processor and memory for electronically processing an electronically stored image;

b. circuitry for storing an image in O (N log ρ), where N is the number of pixels in the image, and ρ is the length of the longest edge structure of interest pixel by pixel in the memory of the computer;

c. said memory storing non-transitory computer coded instructions for configuring computer circuitry for programming the processor of the computer for;

i. filtering the stored image to obtain a set of responses that measures difference of oriented means of various lengths and orientations, and to construct all significantly different oriented means at all locations, lengths, and orientations in the image;

ii. said filtering being carried out by a multiscale edge detection algorithm based on I(x, y) denoting a continuous function representing image intensities given in a two-dimensional domain and the oriented means comprising the family of averages of I(x, y) being denoted along rectangular patches of a given center location x=(x, y), length L, width w, and orientation θ with w set to a small constant yielding elongated oriented means;

iii. processing the oriented means via integrals of the form $$F(x, L, w, \theta) = \frac{1}{wL}\int_{-w/2}^{w/2}\int_{-L/2}^{L/2} I(x + \gamma\cos\theta - \delta\sin\theta,\, y + \gamma\sin\theta + \delta\cos\theta)\,d\gamma\,d\delta. \tag{1}$$

to obtain a family of responses of differences of oriented means defined as $$D(x, L, w, s, \theta) = \tag{2}$$
$$F\left(x + \frac{s}{2}(-\sin\theta, \cos\theta),\, L,\, \frac{w}{2},\, \theta\right) - F\left(x - \frac{s}{2}(-\sin\theta, \cos\theta),\, L,\, \frac{w}{2},\, \theta\right),$$

with s≥w/4 to avoid overlap, and wherein D defines a difference of neighboring orientations of the same orientation;

iv. determining the significance of a collection of such responses by applying a scale adaptive threshold algorithm $$t(L, w, N) = \sigma \sqrt{\frac{2\ln N}{wL}}, \quad (6)$$

to the collection of responses wherein pixel noise is determined as $N(0, \sigma^2)$, and wherein $\sigma$ is a parameter of pixel noise, and wherein a response which exceeds $t(L, w, N)$ can potentially indicate the existence of a real edge;

v. implementing a recursive decision step to classify the collection of responses according to the following classes d. a length-L response D is classified significant if it exceeds the respective threshold, $D > T_L$, and its total gap size is below $\beta L$ and the response is marked as a potential edge and its gap size is reset to zero;

e. a length-L response D is classified nearly-significant if $\alpha T_L < D \leq T_L$ and its total gap size is below $\beta L$ and its gap size is not updated;

f. a length-L response D is classified non-significant if $D \leq \alpha T_L$ or if its total gap size exceeds $\beta L$ and its total gap size is reset to L;

wherein $\alpha$ and $\beta$ are preselected parameters ($0 \leq \alpha$, $\beta \leq 1$) and wherein $\alpha T_L$ is set to be a low threshold for length-L responses, namely, responses of length L that exceed $\alpha T_L$ and do not exceed $T_L$ and are considered nearly significant, and $\beta L$ is set to be a threshold on the total gap size for length-L edges, i.e., a length-L edge is not be considered significant if it contains sub-portions of total length $> \beta L$ that do not exceed their respective low threshold;

vi. wherein the classification of the collection of responses $D(x, L, w, s, \theta)$ obtained for filters of some predetermined short length, e.g., L=1 is carried out and each response is classified to one of the following three classes: (1) significant ($D > T_L$) (2) nearly-significant ($\alpha T_L < D \leq T_L$) and (3) non-significant ($D \leq \alpha T_L$) and for the first two classes, the total gap size is set to "0", while for the latter class the gap size is set to "L", and proceeding sequentially considering lengths L of powers of 2;

vii. testing identified potential edges for statistical significance by examining the intensity profiles along the two sides of a potential edge and eliminating potential edges that do not meet a given standard and marking the remaining edges as significant edges;

viii. applying angular non-maximal suppression to each remaining edge to ensure well-localized significant edges;

ix. applying spatial inter-scale suppression to ensure that each significant edge is identified with its maximal perceptual length;

x. outputting data regarding significant edges of the image to memory; and xi. enabling visualization of the edges, by one of displaying the resulting image on a monitor, storing such images in a memory for future visualization, developing copies of images, and printing a copy of the resulting image.

7. The apparatus of claim 6 wherein the computer circuitry is further configured for programming the processor of the computer for carrying out testing of identified potential edges for statistical significance by denoting by $\sigma_{local}$, a local estimate of the noise, the maximum of the two empirical standard deviations on either side, and removing edges for which $$D < c \sqrt{\frac{2\ln N}{\omega L}} \sigma_{local}$$

with c=a.

8. The apparatus of claim 6 wherein the computer circuitry is further configured for programming the processor of the computer for carrying out filtering by constructing differences of oriented means by adding and subtracting width-1 oriented means of the appropriate length to obtain a family of width-1 oriented means, $F(x, L, w, \theta)$ defined over an infinite set of locations, lengths, and orientations, but under minimal smoothness assumptions of $I(x, y)$, and obtain any oriented mean in this family from only a finite collection of oriented means with oriented means at interim locations, lengths, and orientations determined by interpolation with an accuracy dependent on spatial and angular resolutions.

9. The apparatus of claim 6 wherein the computer circuitry is further configured for programming the processor of the computer for marking detected edges either "red" or "blue", by classifying their gradient orientation relative to a pre-specified canonical orientation and creating two maps, one for the edges marked red and one for the edges marked blue, and for constructing two diffusion maps, one for the red and the other for the blue edge maps, by convolving each with a Gaussian filter, and then multiplying the two diffusion maps to obtain the enhanced fibers.

10. The apparatus of claim 6 wherein the image is nerve cells and the apparatus identifies the branching axonal structures in the image and measures their total length.

11. A non-transitory computer readable storage medium storing non-transitory computer readable instructions wherein execution of the instructions program a processor of a computer to electronically process an image stored in the computer memory to simultaneously extract edges of all lengths, whether the image is a natural or a noisy image, and for enabling visualization of the edges, by one of displaying the resulting image on a monitor, storing such images in a memory for future visualization, developing copies of images, and printing a copy of the resulting image; wherein the image is stored in O (N log $\rho$), where N is the number of pixels in the image, and $\rho$ is the length of the longest edge structure of interest, pixel by pixel in the memory of the computer; said non-transitory computer readable instructions programming the processor of the computer for;

i. filtering the stored image to obtain a set of responses that measures difference of oriented means of various lengths and orientations, and to construct all significantly different oriented means at all locations, lengths, and orientations in the image;

ii. said filtering being carried out by a multiscale edge detection algorithm based on $I(x, y)$ denoting a continuous function representing image intensities given in a two-dimensional domain and the oriented means comprising the family of averages of $I(x, y)$ being denoted along rectangular patches of a given center location $x=(x, y)$, length L, width w, and orientation $\theta$ with w set to a small constant yielding elongated oriented means;

iii. processing the oriented means via integrals of the form $$F(x, L, w, \theta) = \frac{1}{wL} \int_{-w/2}^{w/2} \int_{-L/2}^{L/2} I(x + \gamma\cos\theta - \delta\sin\theta, y + \gamma\sin\theta + \delta\cos\theta) d\gamma d\delta. \quad (1)$$

to obtain a family of responses of differences of oriented means defined as $$D(x, L, w, s, \theta) = \quad (2)$$
$$F\left(x + \frac{s}{2}(-\sin\theta, \cos\theta), L, \frac{w}{2}, \theta\right) - F\left(x - \frac{s}{2}(-\sin\theta, \cos\theta), L, \frac{w}{2}, \theta\right),$$

with $s \geq w/4$ to avoid overlap, and wherein D defines a difference of neighboring orientations of the same orientation;

iv. determining the significance of a collection of such responses by applying a scale adaptive threshold algorithm $$t(L, w, N) = \sigma \sqrt{\frac{2\ln N}{wL}}, \quad (6)$$

to the collection of responses wherein pixel noise is determined as $N(0, \sigma^2)$, and wherein $\sigma$ is a parameter of pixel noise, and wherein a response which exceeds $t(L, w, N)$ can potentially indicate the existence of a real edge;

v. implementing a recursive decision step to classify the collection of responses according to the following classes:
  g. a length-L response D is classified significant if it exceeds the respective threshold, $D > T_L$, and its total gap size is below $\beta L$ and the response is marked as a potential edge and its gap size is reset to zero;
  h. a length-L response D is classified nearly-significant if $\alpha T_L < D \leq T_L$ and its total gap size is below $\beta L$ and its gap size is not updated;
  i. a length-L response D is classified non-significant if $D \leq \alpha T_L$ or if its total gap size exceeds $\beta L$ and its total gap size is reset to L;
  wherein $\alpha$ and $\beta$ are preselected parameters ($0 \leq \alpha, \beta \leq 1$) and wherein $\alpha T_L$ is set to be a low threshold for length-L responses, namely, responses of length L that exceed $\alpha T_L$ and do not exceed $T_L$ and are considered nearly significant, and $\beta L$ is set to be a threshold on the total gap size for length-L edges, i.e., a length-L edge is not be considered significant if it contains sub-portions of total length$>\beta L$ that do not exceed their respective low threshold;

vi. wherein the classification of the collection of responses $D(x, L, w, s, \theta)$ obtained for filters of some predetermined short length, e.g., L=1 is carried out and each response is classified to one of the following three classes: (1) significant ($D>T_L$) (2) nearly-significant ($\alpha T_L < D \leq T_L$) and (3) non-significant ($D \leq \alpha T_L$) and for the first two classes, the total gap size is set to "0", while for the latter class the gap size is set to "L", and proceeding sequentially considering lengths L of powers of 2;

vii. testing identified potential edges for statistical significance by examining the intensity profiles along the two sides of a potential edge and eliminating potential edges that do not meet a given standard and marking the remaining edges as significant edges;

viii. applying angular non-maximal suppression to each remaining edge to ensure well-localized significant edges;

ix. applying spatial inter-scale suppression to ensure that each significant edge is identified with its maximal perceptual length;

x. outputting data regarding significant edges of the image to memory; and xi. enabling visualization of the edges, by one of displaying the resulting image on a monitor, storing such images in a memory for future visualization, developing copies of images, and printing a copy of the resulting image.

12. The non-transitory computer readable storage medium of claim 11 wherein the testing of identified edges Is carried out by denoting by $\sigma_{local}$, a local estimate of the noise, the maximum of the two empirical standard deviations on either side, and removing edges for which $$D < c\sqrt{\frac{2\ln N}{\omega L}} \sigma_{local}$$

with c=a.

13. The non-transitory computer readable storage medium of claim 11 wherein the filtering is carried out by constructing differences of oriented means by adding and subtracting width-1 oriented means of the appropriate length to obtain a family of width-1 oriented means, $F(x, L, w, \theta)$ defined over an infinite set of locations, lengths, and orientations, but under minimal smoothness assumptions of $I(x, y)$, and obtain any oriented mean in this family from only a finite collection of oriented means with oriented means at interim locations, lengths, and orientations determined by interpolation with an accuracy dependent on spatial and angular resolutions.

14. The non-transitory computer readable storage medium of claim 11 further programs the computer for marking detected edges either "red" or "blue", by classifying their gradient orientation relative to a pre-specified canonical orientation and creating two maps, one for the edges marked red and one for the edges marked blue; and for constructing two diffusion maps, one for the red and the other for the blue edge maps, by convolving each with a Gaussian filter, and then multiplying the two diffusion maps to obtain the enhanced fibers.

15. The non-transitory computer readable storage medium of claim 11 wherein the image is nerve cells and the non-transitory instructions program the computer for identifying the branching axonal structures in the image and measuring their total length.

* * * * *